(12) United States Patent
Zhou et al.

(10) Patent No.: US 8,881,376 B2
(45) Date of Patent: Nov. 11, 2014

(54) METHOD OF MANUFACTURING A PERPENDICULAR MAGNETIC RECORDING HEAD LAMINATED WITH AFM-FM PHASE CHANGE MATERIAL

(75) Inventors: Yuchen Zhou, Milpitas, CA (US); Kenichi Takano, Cupertino, CA (US); Kowang Liu, Fremont, CA (US); Kunliang Zhang, Milpitas, CA (US); Liejie Guan, San Jose, CA (US); Moris Dovek, San Jose, CA (US); Joe Smyth, Aptus, CA (US)

(73) Assignee: Headway Technologies, Inc., Milpitas, CA (US)

( * ) Notice: Subject to any disclaimer, the term of this patent is extended or adjusted under 35 U.S.C. 154(b) by 476 days.

(21) Appl. No.: 13/199,179

(22) Filed: Aug. 22, 2011

(65) Prior Publication Data

US 2011/0308074 A1    Dec. 22, 2011

Related U.S. Application Data

(62) Division of application No. 11/894,494, filed on Aug. 21, 2007, now Pat. No. 8,004,794.

(51) Int. Cl.
*G11B 5/127* (2006.01)
*G11B 5/21* (2006.01)
*G11B 5/31* (2006.01)
*G11B 5/147* (2006.01)

(52) U.S. Cl.
CPC ............ *G11B 5/3113* (2013.01); *G11B 5/3146* (2013.01); *G11B 5/147* (2013.01); *G11B 5/1278* (2013.01)
USPC .................. 29/603.07; 29/603.08; 29/603.13; 29/603.14

(58) Field of Classification Search
CPC .......... G11B 5/127; G11B 5/147; G11B 5/21; G11B 5/1278; G11B 5/3113; G11B 5/3146; H01F 41/22; H01F 41/301; H01F 41/302
USPC ............... 29/603.07, 603.08, 603.13, 603.14; 360/50, 125.03, 125.08, 125.12, 125.3, 360/125.31, 128
See application file for complete search history.

(56) References Cited

U.S. PATENT DOCUMENTS 6,088,178 A * 7/2000 Ishida et al. .................... 360/50
6,410,170 B1   6/2002 Chen et al.

(Continued)

OTHER PUBLICATIONS

"Stitched pole-tip design with enhanced head field for perpendicular recording," by Daniel Z. Bai et al., Journal of Applied Physics, vol. 93, No. 10, May 15, 2003, pp. 6540-6542.

(Continued)

*Primary Examiner* — A. Dexter Tugbang
(74) *Attorney, Agent, or Firm* — Saile Ackerman LLC; Stephen B. Ackerman (57) ABSTRACT

A method of manufacturing a PMR writer is disclosed that minimizes pole erasure during non-writing and maximize write field during writing by including an AFM-FM phase change material spacer that is in an AFM state during non-writing and switches to a FM state by heating during writing. The main pole layer including the write pole may be formed as a laminated structure by a sputter deposition process wherein a plurality of "n" ferromagnetic layers and "n-1" AFM-FM phase change material layers are laid down in an alternating manner. The AFM-FM phase change material is preferably a FeRh or FeRhX alloy (X=Pt, Pd, or Ir) having a Rh content >35 atomic %, and may also be used as a flux gate to prevent yoke flux from leaking into the write pole tip.

16 Claims, 10 Drawing Sheets

(56) References Cited

U.S. PATENT DOCUMENTS

| | | | |
|---|---|---|---|
| 6,826,015 | B2 | 11/2004 | Chen et al. |
| 6,834,026 | B2 | 12/2004 | Fullerton et al. |
| 6,998,061 | B1 * | 2/2006 | Cross .................... 29/603.14 X |
| 7,372,116 | B2 | 5/2008 | Fullerton et al. |
| 2003/0108721 | A1 | 6/2003 | Fullerton et al. |

OTHER PUBLICATIONS

"Structural, magnetic, and chemical properties of thin Fe films grown on Rh (100) surfaces investigated with density functional theory," D. Spisak et al., Physical Review B 73, 155428 (2006), The American Physical Society, pp. 1-14.

"Fe/Rh (100) multilayer magnetism probed by x-ray magnetic circular dichroism," M. A. Tomaz et al., Physical Review B, vol. 56, No. 9, Sep. 1, 1977-I, The American Physical Society, pp. 5474-5483.

"A Large Thermal Elasticity of the Ordered FeRh Alloy Film With Sharp Magnetic Transistion," by Shuichiro Hashi et al., IEEE Transactions on Magnetics, vol. 40, No. 4, Jul. 2004, pp. 2784-2786.

"Temperature and field hysteresis of the anitferromagnetic-to-ferromagnetic phase transition in epitaxial FeRh films," by S. Maat et al., Physical Review B 72, 214432 (2005), The American Physical Society, pp. 1-10.

"Magnetic and Structural Properties of FePt—FeRh Exchange Spring Films for Thermally Assisted Magnetic Recording Media," by Jan-Ulrich Thiele, et al., IEEE Transactions on Magnetics, vol. 40, No. 4, Jul. 2004, pp. 2537-2542.

"Magnetic properties of Fe—Rh alloys," by C. Paduani, Journal of Applied Physics, vol. 90, No. 12, Dec. 15, 2001, pp. 6251-6254.

"Antiferro-ferromagnetic transition and microstructural properties in a sputter deposited FeRh thin film system," by Y. Ohtani et al., Journal of Applied Physics, vol. 74, No. 5, Sep. 1, 1993, The American Institute of Physics, pp. 3328-3332.

"Effects of Mechanical and Thermal Treatment of the Structure and Magnetic Transitions in FeRh," by J. M. Lommel et al., Journal of Applied Physics, vol. 38, No. 3, Mar. 1, 1967, pp. 1263-1264.

"Writer Pole Tip Remanence in Perpendicular Recording," by Daniel Z. Bai et al., IEEE Transactions on Magnetics, vol. 42, No. 3, Mar. 2006, pp. 473-480.

"Dependence of the pole-tip remanence on the medium magnetization state underneath the trailing shield of a perpendicular write head," by Yuchen Zhou et al., Journal of Applied Physics 97, 10N518 (2005), American Institute of Physics, pp. 1-3.

"Perpendicular write-head remanence characterization using a contact scanning recording tester," by Yuchen Zhou et al., Journal of Applied Physics 97, 10N903 (2005), American Institute of Physics, pp. 1-3.

"A study of pole material properties for pole erasure suppression in perpendicular recording heads," by Kei Hirata et al., Journal of Magnetism and Magnetic Materials 287 (2005), Elsevier, pp. 352-356.

"Reduction of Coercivity in FePt—FeRh Bilayer Films by Heating," by Shigenobu Koyama et al., IEEE Transactions on Magnetics, vol. 41, No. 10, Oct. 2005, pp. 2854-2856.

* cited by examiner

FIG. 13

METHOD OF MANUFACTURING A PERPENDICULAR MAGNETIC RECORDING HEAD LAMINATED WITH AFM-FM PHASE CHANGE MATERIAL

This is a Divisional application of U.S. patent application Ser. No. 11/894,494, filed on Aug. 21, 2007 now U.S. Pat. No. 8,004,794, which is herein incorporated by reference in its entirety, and assigned to a common assignee.

FIELD OF THE INVENTION

The invention relates to a main pole layer of a PMR writer and in particular to an antiferromagnetic (AFM)-ferromagnetic (FM) phase change material that may be employed in the write pole tip and/or the yoke to minimize data erasure after a write operation without significantly reducing the write field during a write operation.

BACKGROUND OF THE INVENTION

Perpendicular magnetic recording (PMR) has become the mainstream technology for disk drive applications beyond 200 Gbit/in$^2$, replacing longitudinal magnetic recording (LMR) devices. Due to the continuing reduction of transducer size, high moment soft magnetic thin films with a Bs above 22 kG are required for write head applications. A PMR head which combines the features of a single pole writer and a double layered media has a great advantage over LMR in providing higher write field, better read back signal, and potentially much higher areal density. In particular, a shielded pole head can provide a large head field gradient at the trailing side due to the presence of a trailing shield and substantially improve the write performance.

Perpendicular recording demands increasingly smaller pole tip size in the magnetic recording heads to achieve higher data density on the magnetic medium. However, prior studies have shown that the perpendicular direction shape anisotropy in the smaller writer pole tips may lead to serious pole erasure (PE). In other words, a remanent magnetic field can exist in the write pole tip after the write current is turned off thereby leading to data erasure in the magnetic medium during non-write operations. References related to this subject are (1) K. Hirata et al., "A study of pole material properties for pole erasure suppression in perpendicular recording heads", J. Magn. Magn. Mat., Vol. 287, pp. 352-356, November 2004; (2) Y. Zhou et al., "Perpendicular write head remanence characterization using a contact scanning recording tester", J. Appl. Phys., Vol. 97, 10N903 (2005); and (3) Y. Zhou and J.-G. Zhu, "Dependence of the pole tip remanence on the medium magnetization state underneath the trailing shield of a perpendicular write head", J. App. Phys. Vol. 97, 10N518 (2005).

To alleviate the PE problem, two approaches are described by D. Bai et al. in "Writer pole tip remanence in perpendicular recording", IEEE Trans. Magn., Vol. 42, p. 473 (2006) and typically involve making the writer head into a laminated multi-layered structure through dry film deposition methods. According to a first method, making the write head into a laminated multi-layer structure where thicker magnetic layers are separated by thinner non-magnetic layers, the magneto-static coupling field between the adjacent layers through the edge charges will help the write pole maintain a near zero net magnetic moment when the write current is turned off. The inter-layer magneto-static coupling prefers an anti-parallel magnetization orientation of adjacent magnetic layers which leads to charge cancellation between the adjacent magnetic layers and to a net zero magnetic charge from the write pole tip as a whole. The second approach is similar to the first. However, the thin spacer layer between neighboring magnetic layers is chosen from a specific metal such as Ru or Cr and has a specific thickness. Thus, due to the Ruderman-Kittel-Kasuya-Yoshida (RKKY) interaction between localized moments mediated by the conduction electrons of the spacer metal, an AFM exchange coupling between the adjacent magnetic layers can be established. This AFM coupling field is usually much higher than the magneto-static coupling field involved in the first approach and therefore is more effective in reducing the PE field in perpendicular write heads.

Unfortunately, reducing the PE field with either magneto-static coupling or AFM coupling results in a loss in writability (write field) and particularly near the trailing edge of the write pole tip. The coupling field that minimizes PE also reduces the write field through the same interactions. In addition, a non-magnetic spacer layer causes a further decrease in write field because of a reduced volume of magnetic material in the write pole. Thus, a trade off exists between reducing the PE field during non-write operations and maintaining a strong write field during the writing process in state of the art PMR technology.

It is known in the prior art that FeRh has an abrupt first order transition from an AFM phase to a FM phase without structural change at a rather low temperature of 330° K to 350° K. This abrupt phase change is thought to be associated with a CsCl type bodied centered cubic (bcc) $Fe_{50}Rh_{50}$ alloy. References include the following: J. Lommel and J. Kouvel, "Effects of mechanical and thermal treatment on the structure and magnetic transitions of FeRh", J. Appl. Phys., Vol. 38, pp. 1263-1264, March 1967; Y. Ohtani and I. Hatakeyama, "Antiferro-ferromagnetic transition and microstructural properties in a sputter deposited FeRh thin film system", J. Appl. Phys., Vol. 74, p. 3328, September 1993; C. Paduani, "Magnetic properties of Fe—Rh alloys", J. Appl. Phys., Vol. 90, p. 6251, December 2001; and J. Thiele et al., "Magnetic and Structural Properties of FePt—FeRh Exchange Spring films for Thermally Assisted Magnetic Recording Media", IEEE Trans. Magn., Vol. 40, p. 2537 (2004).

In U.S. Patent Application Publication No. 2003/0108721 and in a publication by S. Koyama et al., "Reduction of coercivity in FePt—FeRh bilayer films by heating", IEEE Trans. Magn., Vol. 41, p. 2854 (2005), the AFM-FM phase transition is shown to increase or decrease by controlling the seed layer and employing a FeRhX alloy where X can be Pd, Pt, Ir, etc. Compositional control of the FeRhX material can also produce as narrow as a 10° K to −20° K difference in AFM=>FM transition temperature during heating and FM=>AFM transition temperature during cooling. In related U.S. Pat. No. 6,834,026, a TAMR disk is described that is comprised of a bilayer of an FM layer and a layer that switches between FM and AFM states by a temperature change.

Figure 1:
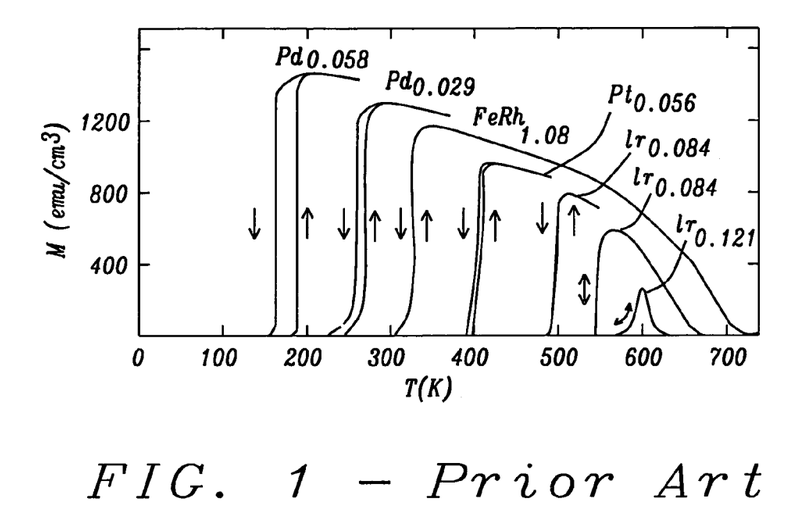
FIG. 1 is a plot from a prior art reference that shows magnetization of FeRhX alloys vs. temperature in the form of AFM-FM transition curves.

Referring to FIG. 1, an illustration of AFM=>FM transition curves taken from U.S. Patent Application Publication No. 2005/0281081 is shown for different FeRh alloys with various compositions. This composition modifiable switching temperature and narrow transition window theoretically make the AFM/FM phase control of FeRh alloys easy to realize during actual write head operations.

The prior art references mentioned above that involve FeRh or FeRhX alloys are mainly focused on magnetic recording medium applications where an FeRh alloy layer is part of the magnetic recording layer that also contains another hard magnetic material which has a very high anisotropy. A high anisotropy in the hard magnetic material is needed to enhance the recorded bit's thermal stability when the bit physical size is in the sub-micron range. However, the high anisotropy also makes the magnetization in the recording layer not easy to reverse during a write process. Thermal heating of the FeRh induces an AFM to FM transition and the resulting FM state of the FeRh is a soft material with very low anisotropy. With the FM exchange between the hard magnetic layer and the FeRh layer, the FM phase of FeRh enables an easier reversal of magnetization in the recording layer during a write process. Heat assisted magnetic recording, also known as HAMR, has been a topic of major interest in the prior art. A similar idea is utilized in a MRAM application in U.S. Patent Application Publication No. 2005/0281081 where a data storage layer is also a hard material abutted with a FeRh layer. The switching current field is easier to reverse by means of a thermally induced FM phase in the FeRh layer.

Formation of a FeRh layer in the prior art usually involves relatively high temperature (>400° C.) during deposition as described in the aforementioned Thiele reference, and typically includes an after-deposition thermal treatment. This process which generally results in a bcc CsCl type FeRh crystalline structure is considered too harsh for commercial recording head fabrication. More recent methods are shown to form a bcc FeRh structure with lower substrate temperature and shorter annealing time and involve proper selection of seed layer and substrate as described by S. Maat et al. in "Temperature and field hysteresis of the antiferromagnetic-to-ferromagnetic phase transition in epitaxial FeRh films", Phys. Rev. B, Vol. 72, p. 214432-1 (2005), or employ an equi-atomic composition of Fe and Rh as described by S. Hashi et al., "A large thermal elasticity of the ordered FeRh alloy film with sharp magnetic transition", IEEE Trans. Magn., Vol. 40, p. 2784 (2004).

Replacing a small percentage of the Rh atoms in the FeRh lattice with an equal amount of Pd, Pt, or Ir atoms could help to reduce the annealing temperature and annealing time during a FeRhX alloy deposition without a significant reduction in magnetic moment. With Pd, Pt, or Ir addition, the resulting FeRhPd, FeRhPt, or FeRhIr alloys can also reduce the FM=>AFM transition temperature down to about 100° C., making it more practical for device applications. Besides conventional deposition and after-deposition annealing, a multi-layer FeRh structure with mono-layer level Fe/Rh thickness and a bcc-like structure has been formed as shown by M. Tomaz et al., "Fe/Rh (100) multilayer magnetism probed by x-ray magnetic circular dichroism", Phys. Rev. B, Vol. 57, p. 5474, September 1997. A FeRh structure with an intrinsic AFM state is described by D. Spisak and J. Hafner in "Structural, magnetic, and chemical properties of thin Fe films grown on Rh (100) surfaces investigated with density functional theory", Phys. Rev. B, Vol. 73, p. 155428 (2006). These results may provide an alternative way to synthesize a bcc FeRh thin film layer for AFM/FM transition.

In U.S. Pat. No. 6,410,170, a FeRh layer is used in a pole or shield structure of a write head.

Figure 2:
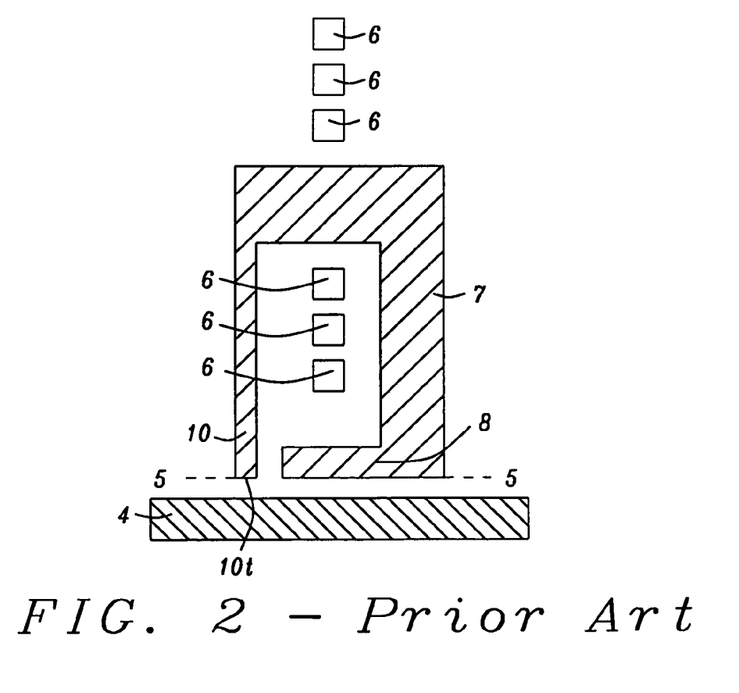
FIG. 2 is a cross-sectional view of a conventional PMR writer showing the main write pole, flux return pole, magnetic recording media, and coils that generate magnetic flux.

A conventional PMR write head as depicted in FIG. 2 typically has a main pole layer 10 with a pole tip 10t at an air bearing surface (ABS) 5 and a flux return pole (opposing pole) 8 which is magnetically coupled to the write pole through a trailing shield 7. Magnetic flux in the main pole layer 10 is generated by coils 6 and passes through the pole tip into a magnetic recording media 4 and then back to the write head by entering the flux return pole 8. The write pole concentrates magnetic flux so that the magnetic field at the write pole tip 10t at the ABS is high enough to switch magnetizations in the recording media 4. A trailing shield 7 is added to improve the field gradient in the down-track direction.

Figure 3:
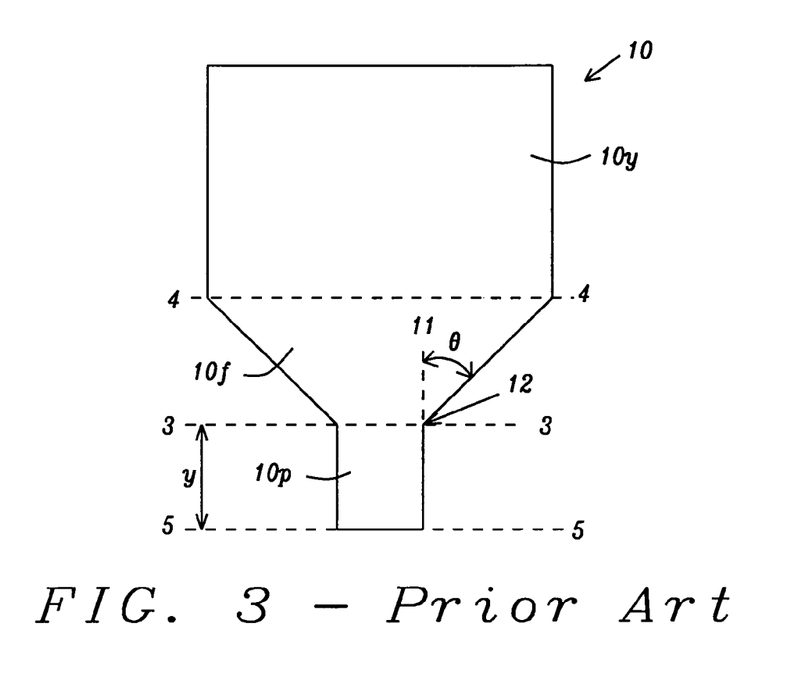
FIG. 3 is a down track view of a main pole layer of a conventional PMR write head that shows the yoke, flare portion, and write pole portion, and a flare angle.

Referring to FIG. 3, a top view is shown of a typical main pole layer 10 that has a large, wide portion called a yoke 10y, a narrow rectangular portion 10p called a write pole that extends a neck height (NH) distance y from the ABS plane 5-5 to a plane 3-3 parallel to the ABS where the pole intersects a flare portion 10f at the neck 12. The flare portion 10f adjoins the yoke along a plane 4-4 and flares outward from the plane 3-3 at an angle θ from a dashed line 11 that is an extension of one of the long rectangular sides of the write pole 10p. PMR technologies require the pole 10p at the ABS to have a beveled shape (as viewed from the ABS) so that the skew related writing errors can be suppressed. A write head may also have a stitched pole configuration as described in U.S. Pat. No. 6,826,015.

One disadvantage of prior art AFC lamination schemes is that the coupling strength of a FeCo/Ru/FeCo configuration or the like is typically large and this type of AFC lamination will inevitably cause a large anisotropy field and low magnetic moment under a low field. Although the coupling strength can be lowered by using a thicker non-magnetic layer (increasing Ru thickness from 7.5 to about 18 Angstroms, for example), the magnetic moment will be diluted as the non-magnetic content in the FeCo/Ru/FeCo stack is increased. Therefore, an improved lamination scheme for a write pole is needed that enables a high magnetic moment while simultaneously providing a mechanism to reduce remanence.

SUMMARY OF THE INVENTION

One objective of the present invention is to provide a laminated main pole layer that reduces remanence during non-write operations to minimize pole erasure, and has a strong write field comparable to single pole writers to achieve high writability.

Another objective of the present invention is to provide a flux gate in the main pole layer to reduce remanent flux leaking from the yoke into the write pole tip and thereby minimizing pole erasure caused by yoke remanence.

These objectives are realized in the present invention by providing a laminated main pole layer comprised of an AFM-FM phase change material as a spacer layer in the lamination scheme. During non-write operations, the phase change material is in an AFM state that results in magneto-static coupling to minimize remanence. The phase change material may be switched by heating to a FM state to promote a strong write field during write operations. Localized heating may be provided by a small heating coil in the write gap region near the write pole tip. The phase change material may be FeRh or a FeRhX alloy where X is an element including but not limited to Pd, Pt, and Ir.

In one embodiment, the entire main pole layer including yoke, flare portion, and write pole is laminated with a plurality of "n" ferromagnetic layers and "n−1" AFM-FM phase change material layers formed in an alternating fashion. There is a ferromagnetic layer formed at the top and bottom of the laminated stack and neighboring ferromagnetic layers are separated by an AFM-FM phase change material layer that serves as a spacer. The planes of the layers are perpendicular to the ABS. Control of the AFM-FM transition occurs by heating and cooling from the writer coils and/or a local heater near the write pole at writing and non-writing conditions, respectively. Optionally, heating/cooling can be realized by a separate heating coil in the write gap region near the write pole tip.

A second embodiment is similar to the first embodiment except that a ferromagnetic layer is added for additional flux on one or both sides of the laminated stack when viewed from a cross-track direction of the write head. From a perspective at the ABS plane, the ferromagnetic layer is added at the top and/or the bottom of the laminated stack. The one or two ferromagnetic layers are formed in the yoke portion and extend over a section of the flare portion but not over the write pole.

In a third embodiment, the PMR head is partially laminated. The yoke and all or a section of the flare portion are made of a single ferromagnetic layer while the write pole is comprised of a laminated stack having a plurality of "n" ferromagnetic layers and "n–1" AFM-FM phase change material layers arranged in an alternating fashion such that neighboring ferromagnetic layers are separated by an AFM-FM phase change material spacer. From a cross-track view where the ABS is at the bottom, the write head has a top ferromagnetic yoke portion directly above a bottom laminated portion that includes at least the write pole tip portion.

A fourth embodiment is similar to the third embodiment except the ferromagnetic yoke is not directly above the laminated portion but is positioned on one side of the laminated stack from a cross track view to form a stitched pole structure. The flare portion of the main pole layer has a first section made of a single ferromagnetic layer that is coplanar with the yoke, and a second laminated section that adjoins the first section along one side. The second laminated section has the same width and thickness as the laminated write pole portion and connects with the first section through a ferromagnetic layer. The laminated structure has a plurality of "n" ferromagnetic layers and "n–1" AFM-FM phase change material layers formed in alternating fashion.

In a fifth embodiment, the PMR head from a cross-track view has at least a portion of the yoke and the entire write pole made of a single ferromagnetic layer. Between the write pole and the yoke is an AFM-FM phase change material layer that serves as a flux gate to prevent remanence flux leaking from the yoke into the write pole. In one aspect, only the flare portion of the main pole layer is made of the AFM-FM phase change material. However, the present invention also encompasses an embodiment in which the flare portion and a section of the yoke that adjoins the flare portion are made of an AFM-FM phase change material. As mentioned previously, AFM-FM transition is achieved by heating/cooling from the write coils at writing/non-writing conditions or by thermal heating/cooling realized with a separate electrical path that heats locally on the laminated portion of the write head with electrical current.

In a sixth embodiment, the main pole layer has a stitched structure in which the yoke portion and a first section of the flare portion form a single ferromagnetic layer. A second section of the flare portion and the write pole have the same thickness and width and are comprised of an AFM-FM phase change material layer and a ferromagnetic layer. One side of the AFM-FM phase change material layer in the second section adjoins a side of the first section of the flare portion, and a side of the AFM-FM phase change material layer opposite the first section adjoins the single ferromagnetic layer in the write pole and second section of the flare portion. The AFM-FM phase change material layer may serve as a flux gate to prevent remanent flux from the yoke and first section of the flare portion from reaching the write pole tip.

There is a seventh embodiment similar to the sixth embodiment except the single ferromagnetic layer in the write pole and second section of the flare portion is replaced by a laminated structure comprised of "n" ferromagnetic layers and "n–1" AFM-FM phase change material layers that are formed in an alternating fashion. The AFM-FM phase change material layer that contacts the first section of the flare portion may be thicker than the other AFM-FM phase change material layers in the laminated stack.

DETAILED DESCRIPTION OF THE INVENTION

The present invention is a PMR write head comprised of an AFM-FM phase change material and a method of making the same. A design is described wherein at least a section of the main pole layer comprised of yoke, flare portion, and write pole is made of an AFM-FM phase change material to enable switching back and forth from a non-writing state that has magneto-static coupling between adjacent magnetic layers, and a writing state having ferromagnetic coupling between adjacent magnetic layers. As a result, magneto-static coupling between adjacent magnetic layers that reduces magnetic remanence to minimize pole erasure can be switched by heating, mechanical, or electrical controlled changes to FM coupling which provides a strong write field to enhance writability. The present invention is not bound by any particular write pole shape as viewed from the ABS plane or a down-track view and thereby encompasses a variety of shape designs as appreciated by those skilled in the art.

The inventors were motivated to improve the design of a PMR write head since prior art laminated schemes that minimize remanent magnetization in order to suppress pole erasure (PE) have a disadvantage in poor writability. In particular, there is a trade-off between reducing PE field and maintaining head field during writing mainly because the physical mechanism (AFM or magneto-static coupling field) which is desirable in a non-writing condition to help reduce PE field also exists in a writing operation where it is not desirable. The inventors have overcome the intrinsic problem that exists in conventional laminated write heads by employing an AFM-FM phase change material in the main pole layer and in particular, as a spacer between adjacent ferromagnetic layers in a laminated scheme. However, the AFM-FM phase change material may also be formed between a FM layer in the yoke and a FM layer in the write pole to minimize flux leakage from the yoke to the write pole tip as described in various embodiments of the present invention.

It is known in the prior art that for a FeRh alloy at transition temperatures from 300° K to about 400° K, the AFM state magnetization is close to zero and FM state magnetization can be more than 1000 emu/cc. According to the present invention, when an AFM-FM phase change material such as FeRh or a FeRhX alloy is employed as a spacer layer in a laminated main pole layer, the low temperature AFM state is similar to a conventional non-magnetic material and the PE field is reduced by inter-layer magneto-static interaction. FeRh or a FeRhX alloy at a high temperature FM state has a magnetization higher than Permalloy which helps increase the head field because of the FM state's large magnetic moment. Furthermore, the FM state promotes FM exchange coupling between adjacent magnetic layers and thereby increases the head field with the additional contribution from the magnetic layers that results from a better saturation of these magnetic layers.

Figure 4A:
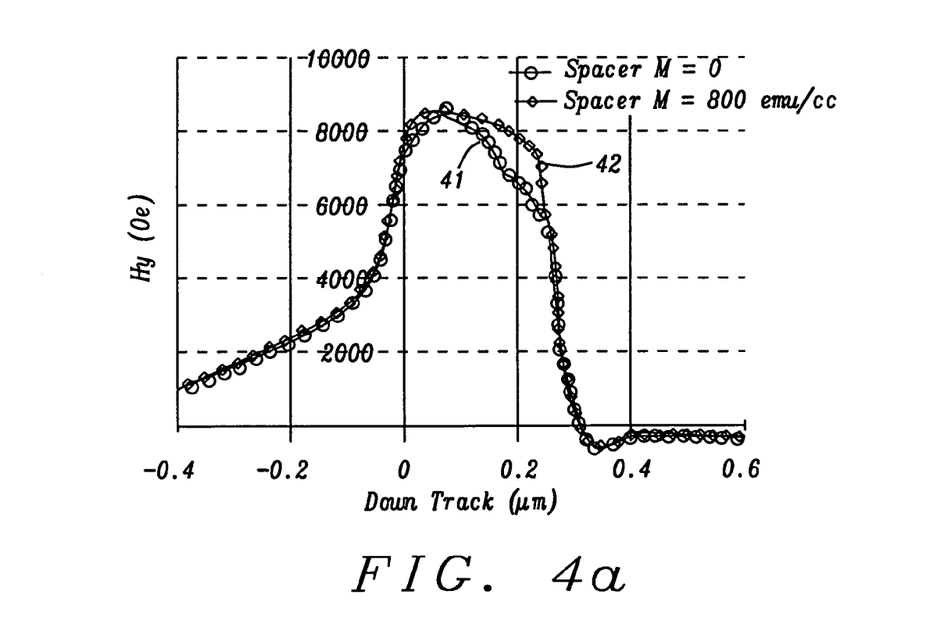
FIG. 4a is a FEM simulation of a write field vertical component vs. down-track position for a laminated stack having a non-magnetic spacer and a magnetic spacer.

Referring to FIG. 4a, a finite-element (FEM) simulation demonstrates the different effect of a non-magnetic spacer layer and a magnetic spacer layer during a write operation. The results in curve 41 represent a laminated PMR write head with a non-magnetic spacer similar to a conventional laminated main pole layer while curve 42 shows a laminated PMR write head with a magnetic spacer that has a saturation magnetization of 800 emu/cc and indicates the capability of a FeRh like AFM-FM phase change material as a spacer that has a certain magnetization during writing. The write pole has a 250 nm thickness and a 100 nm pole width. Eight equally separated pole spacer layers with a thickness of 6 nm are used for the calculations. The write field vertical component amplitude is plotted as a function of the down-track location. Although the highest field is the same for the non-magnetic and magnetic spacer examples, the field level and field gradient at the transition point (trailing edge) are obviously higher for the magnetic spacer, indicating a better writability.

Figure 4B:
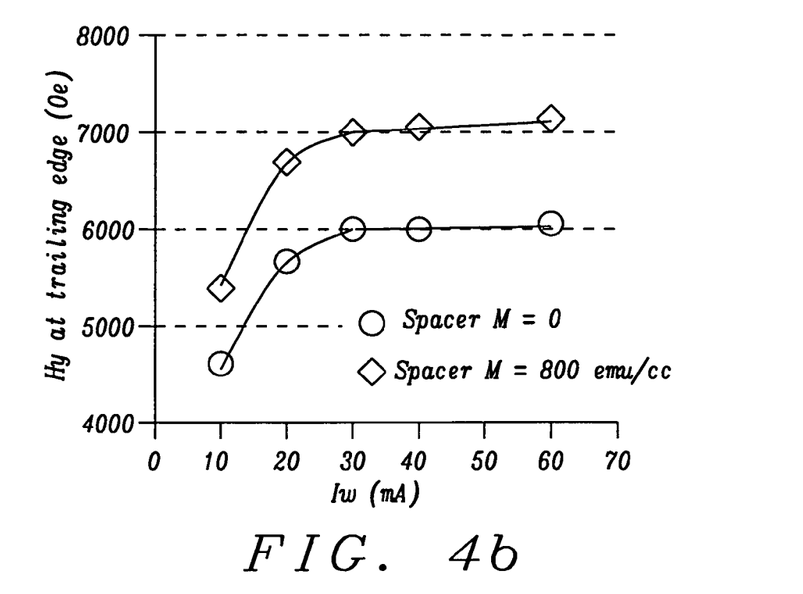
FIG. 4b is a FEM simulation of a trailing edge vertical field vs. write current for a laminated stack having a non-magnetic spacer and a magnetic spacer.
Figure 4C:
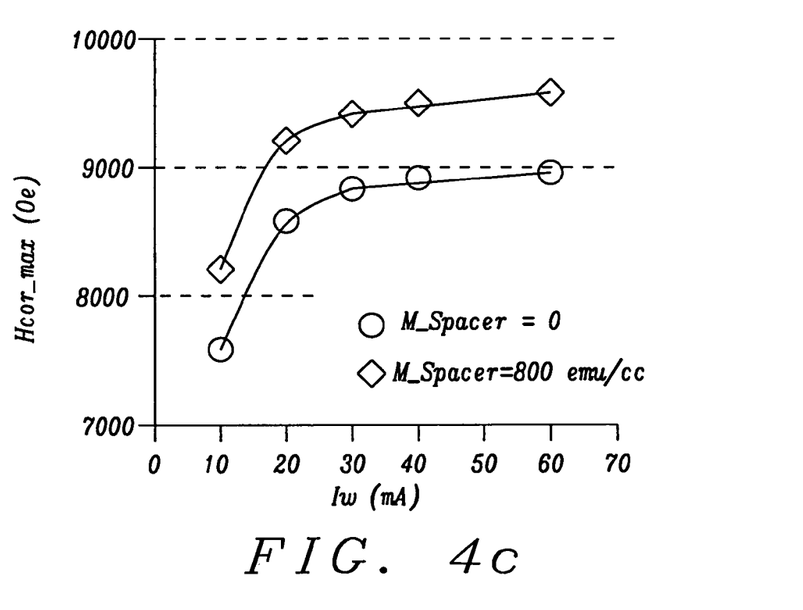
FIG. 4c is a FEM simulation of maximum corresponding field (effective field) vs. write current for a laminated stack having a non-magnetic spacer or a magnetic spacer.

Referring to FIG. 4b, the trailing edge vertical field is plotted as a function of the write current amplitude for the non-magnetic spacer and magnetic spacer examples. In FIG. 4c, the maximum corresponding field (effective write field considering the field angle effect for a Stoner-Wohlfarth type magnetic recording medium) is plotted as a function of write current. In FIG. 4b, the trailing edge vertical field for the magnetic spacer example shows approximately a 1000 Oe write field increase at 60 mA compared with the non-magnetic spacer. FIG. 4c shows there is more than a 500 Oe higher effective write field for the magnetic spacer example at each current. Considering that the 800 emu/cc value is less than the maximum magnetization of FeRh reported in the prior art, the FeRh-like AFM-FM phase change spacer has the potential to enhance the write field even further. Additionally, if one takes into account the FM exchange effect from the spacer in its FM state, which is not included in the FEM simulation, the write field enhancement can be more substantial.

According to the present invention, various embodiments of main pole layer having an AFM-FM phase change material in one or more sections of a yoke, flare portion, or write pole are described. The AFM-FM phase change material is used to minimize magnetic remanence and also enhance the write field, particularly near the trailing edge.

Figure 5:
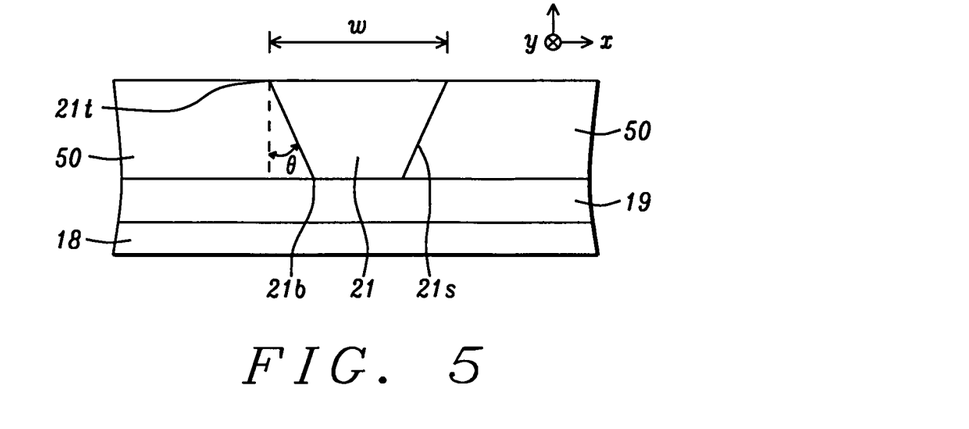
FIG. 5 shows a cross-sectional view from the ABS plane of a write pole formed within an insulation layer on a substrate according to the present invention.

Referring to FIG. 5, a view of the write pole 21 of a main pole layer formed within an insulation layer 50 according to the present invention is depicted from an ABS plane. A substrate 18 is provided that may be comprised of AlTiC, for example. The substrate 18 may also be an insulation layer formed on a top shield (not shown) in a merged read/write head. In one embodiment, a RIE resistant layer 19 may be formed on the substrate 18 by a sputter deposition or physical vapor deposition (PVD) process, for example, and preferably is made of a material such as Ru or NiCr that has a high selectivity relative to an insulating material such as alumina during a subsequent RIE etch that uses $BCl_3$, chlorine, and fluorocarbon gases. Alternatively, the write pole 21 and main pole layer may be formed directly on the substrate 18 or on a seed layer disposed on the substrate. Above the RIE resistant layer 19 is an insulation layer 50 wherein a mold shape comprising an opening for the write pole (and main pole layer) is formed. The insulation layer 50 may be comprised of $Al_2O_3$ or silicon oxide that is deposited by a PVD process, a sputtering technique, or the like in the same deposition tool as the RIE resistant layer. The insulation layer 50 may also be made of other dielectric materials known in the art. In an embodiment where the write pole 21 and main pole layer are sputter deposited to fill the mold opening, the insulation layer 50 has a thickness equivalent to the desired thickness of the main pole layer and a chemical mechanical polish (CMP) technique may be employed to planarize the main pole layer including write pole 21. Optionally, the main pole layer and write pole 21 may be formed by first depositing one or more magnetic layers on the substrate 18 with or without an etch stop layer 19 by a sputter deposition process, for example. Then a photoresist layer (not shown) is patterned on the main pole layer material followed by one or more etch steps that define the shape of the write pole 21 and main pole layer. Thereafter, the photoresist is stripped and the insulation layer 50 is deposited. A CMP process may be used to make the insulation layer 50 coplanar with the write pole 21 and main pole layer.

In one embodiment of the present invention, the write pole 21 has a trapezoidal shape with sloped sidewalls 21s wherein the top surface 21t of the write pole has a larger width along the ABS plane than the bottom surface 21b. The width w may be referred to as the track width. Moreover, the sidewalls 21s are sloped at an angle θ of about 5 to 20 degrees with respect to the plane of the RIE resistant layer 19 (and substrate 18). The pole has a beveled shape with an angle θ so that the skew related writing errors can be suppressed. Note that during a write operation, the write pole 21 moves in a negative "z" direction such that the top surface 21t is the trailing edge. The present invention also anticipates other write pole structures such as one where the top surface 21t has a concave shape that can be formed by performing an etching process on a trapezoidal shape.

Figure 6A:
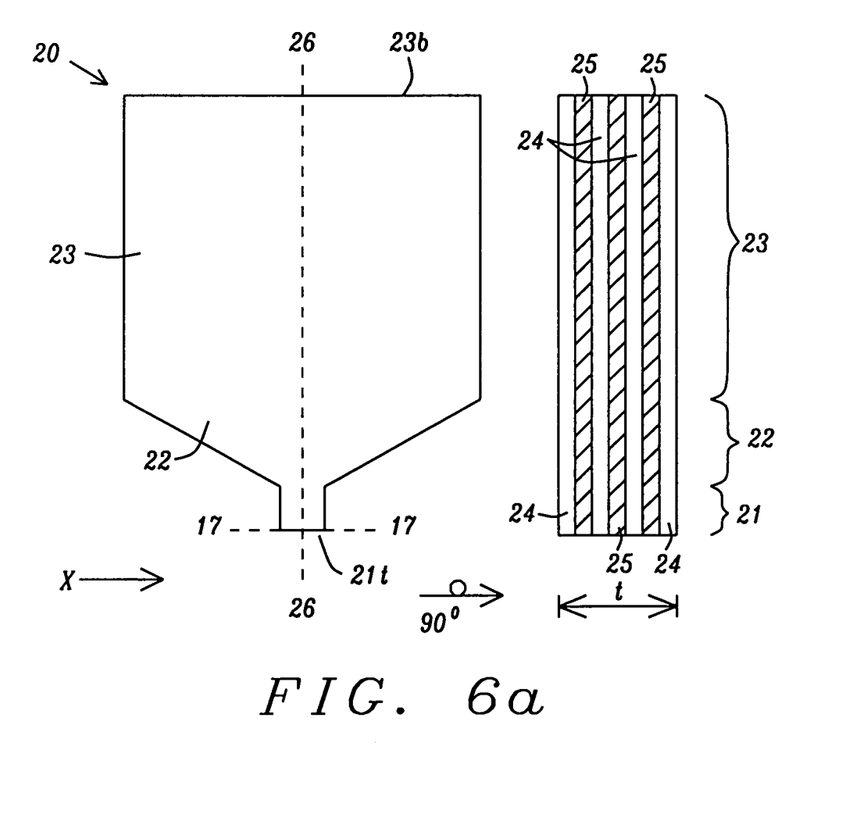
FIG. 6a shows a down-track view (left) and cross-track view (right) of a laminated PMR write head according to a first embodiment of the present invention.

Referring to FIG. 6a, a first embodiment of the present invention is illustrated with a down-track view of a PMR write head 20 on the left and a cross-track view on the right. The cross-track view is obtained by rotating the down-track view 90 degrees into the plane of the paper along the axis 26-26. The PMR writer is comprised of a write pole 21 having a write pole tip 21t formed along the ABS (not shown), a flare portion 22 of a main pole layer that adjoins a side of the write pole opposite the ABS, and a yoke 23 that adjoins the flare portion along a side (not shown) opposite the write pole. In other words, the flare portion approximates a triangular shape, and the yoke may have a rectangular or square shape as viewed from a down-track position. The yoke 23 concentrates the magnetic flux and serves as a conduction path of the magnetic field generated by the writer coils (not shown) on one or both sides of the yoke. The flare portion 22 usually serves to further concentrate the flux from the yoke 23 into the write pole tip 21t. The back end of the yoke 23 is considered to be a side of the yoke that is farthest from the ABS.

An important feature is that the entire PMR head 20 is laminated with a plurality of "n" ferromagnetic layers 24 and "n−1" AFM-FM phase change material spacers 25. Preferably, there is a ferromagnetic layer 24 at each side from a cross-track view and the ferromagnetic layers 24 and AFM-FM phase change material spacers 25 are arranged in alternating fashion. The planes of the layers 24, 25 are oriented perpendicular to the ABS 17-17. In the exemplary embodiment, the write pole 21, flare portion 22, and yoke 23 are coplanar and have the same thickness t of about 0.05 to 0.4 microns in a direction parallel to the ABS. In one aspect, all of the ferromagnetic layers 24 have a same first thickness in the "x" direction and all of the AFM-FM phase change material spacers 25 have a same second thickness in the "x" direction of about 1 to 20 nm. Preferably, the second thickness is less than the first thickness in order to optimize the ferromagnetic content and the write field. Optionally, one or more of the ferromagnetic layers 24 may have a thickness different than the other magnetic layers, and one or more of the AFM-FM phase change material spacers 25 may have a different thickness than the other AFM-FM phase change material spacers.

Figure 6B:
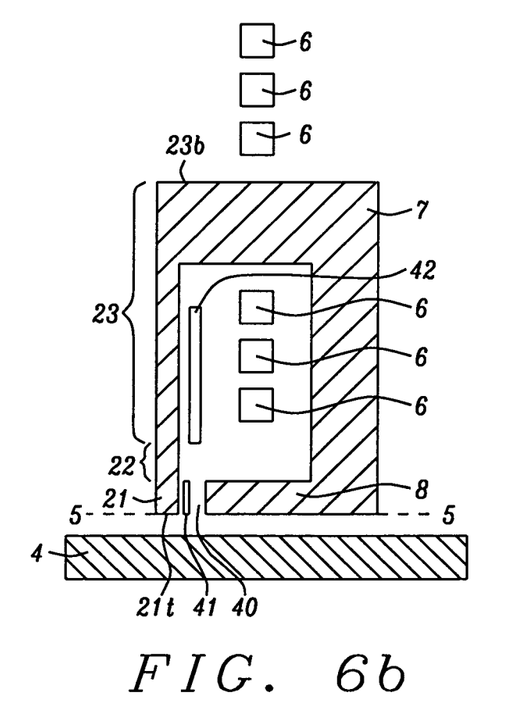
FIG. 6b is a cross-sectional view of a PMR writer according to an embodiment of the present invention including a write pole, flux return pole, heater element that can provide heating to the write pole, and coils that generate magnetic flux.

The ferromagnetic layers 24 may be comprised of a material including but not limited to CoFe, CoFeNi, CoFeN, and NiFe. The AFM-FM phase change material spacers 25 are preferably comprised of FeRh or a FeRhX alloy where X is Pd, Pt, Ir, or the like and the Rh content is greater than 35 atomic %. The AFM-FM phase change material spacers 25 are in an AFM state when the PMR writer is not in a writing mode and are in a FM state during a writing operation. In one embodiment (FIG. 6b), the transition from an AFM to a FM state is accomplished by means of heating that is provided by the writer coils 6. Alternatively, the AFM to FM transition is realized by employing a separate resistive heater 42 or a separate heater coil 41 for heating the write pole tip portion of the main pole layer or the section of the main pole layer containing the AFM/FM phase change material. In still another embodiment, the writing coils 6 and a separate resistive heater or separate heater coil 41 are used to provide heating for the AFM-FM transitions. For example, a heater coil 41 may be formed within the write gap region 40 between the write pole 21 and the flux return pole 8. This type of local heating reduces thermal interference between AFM-FM transitions in the PMR writer and control of writer/reader fly height. Typically, an AFM-FM phase change material spacer 25 is in an AFM state when the temperature of the laminated structure is ≤370° K, or ≤70° C. above room temperature, and is in a FM state when the temperature of the laminated structure is ≥400 K or about ≥100° C. above room temperature. For example, the actual transition point for a $Fe_{48}Rh_{52}$ alloy is between 70° C. and about 100° C. At any temperature below the transition point, the AFM-FM phase change material is in the AFM state. Transition from a FM state to an AFM state is accomplishing by cooling in the writer coils and/or in the localized heat source or resistive heater. Those skilled in the art will appreciate that a Dynamic Fly Heater (DFH) may be employed as a resistive heater 42 and may be located proximate to the back end 23b of the yoke 23.

Figure 7A:
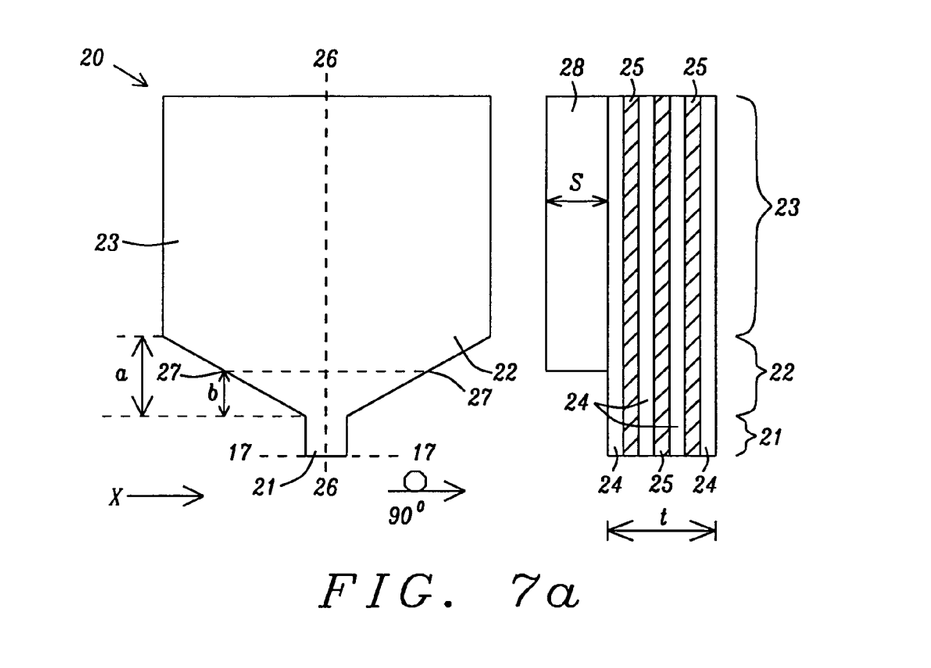
FIGS. 7a, 7b show down-track views (left) and cross-track views (right) of a laminated PMR write head according to a second embodiment of the present invention.
Figure 7B:
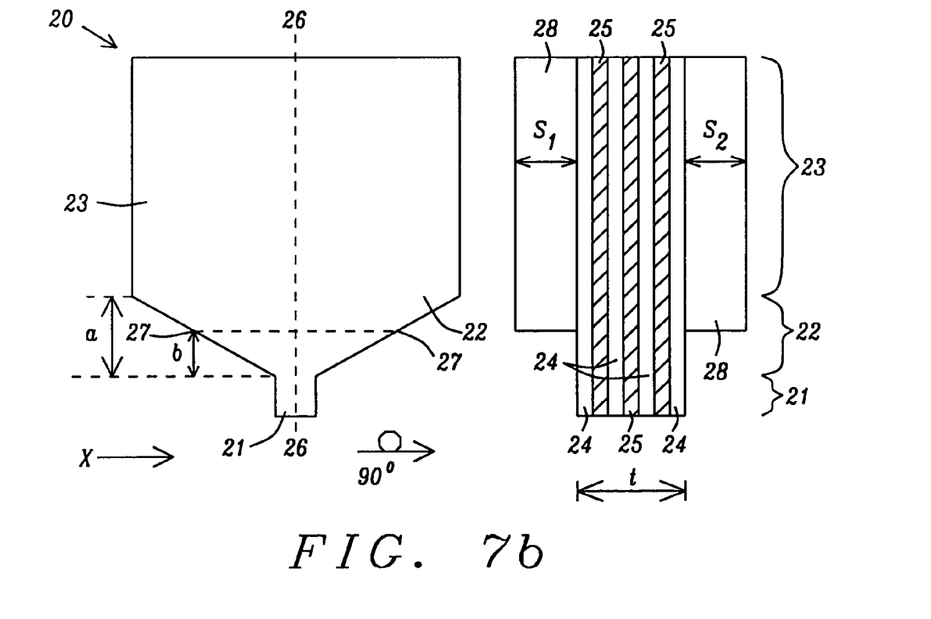

Referring to FIG. 7a, a second embodiment is depicted that is similar to the first embodiment except a ferromagnetic layer 28 is added on one side of the laminated main pole layer adjacent to a ferromagnetic layer 24. The ferromagnetic layer 28 which is used to add magnetic flux to the write pole tip may be comprised of the same material as in ferromagnetic layers 24 and has a thickness s in the x-axis direction parallel to the ABS 17-17 of 0.1 to 10 microns. The value of s may be greater than or less than that of thickness t depending upon the amount of added flux desired in the PMR writer 20. In FIG. 7b, the second embodiment also encompasses a PMR writer configuration wherein a second ferromagnetic layer 28 having a thickness $s_2$ may be added to the side of the laminated structure (cross-track view) adjacent to a second ferromagnetic layer 24 and opposite a first ferromagnetic layer 28 that has a thickness $s_1$ in an x-axis direction. From a cross-track view on the right side of the drawing, the one or two ferromagnetic layers 28 in FIGS. 7a, 7b, respectively, should extend across the entire yoke 23 and over a section of the laminated structure in the flare portion 22, but not over the write pole 21. As illustrated in FIGS. 7a, 7b, the flare portion 22 extends a distance a between the write pole 21 and the yoke 23 according to a down-track view on the left side of the drawings. However, a ferromagnetic layer 28 does not cover the entire flare portion 22 but stops a certain distance b along the plane 27-27 which is at the end of the write pole 21 opposite the ABS 17-17. The $s_1$ thickness is not necessarily the same as the $s_2$ thickness, and both $s_1$ and $s_2$ may be greater than or less than t depending upon the amount of additional magnetic flux desired. In the second embodiment, a ferromagnetic layer 28 may be formed by an electroplating process while the laminated structure is formed by a sputter deposition process.

Figure 8:
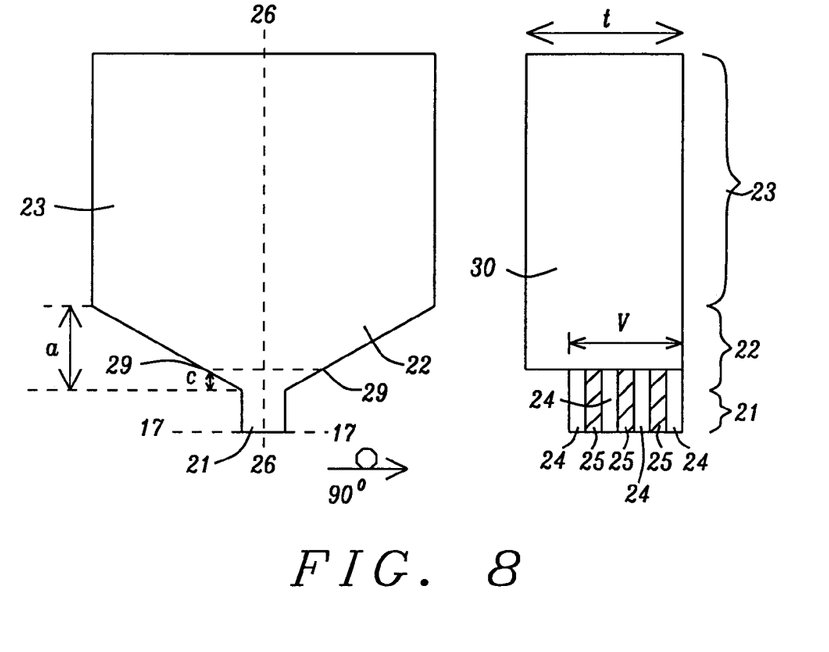
FIG. 8 shows a down-track view (left) and cross-track view (right) of a laminated PMR write head according to a third embodiment of the present invention.

Referring to FIG. 8, a third embodiment is shown with a down-track view (left) and cross-track view (right) wherein the PMR writer 20 is partially laminated. In particular, the yoke 23 is comprised entirely of a single ferromagnetic layer 30 that may be made of the same magnetic material as in ferromagnetic layers 24. In addition, the ferromagnetic layer 30 extends into the flare portion and stops at a plane 29-29 that is a distance c of about 0 to 10 microns from the end of the write pole 21 that is opposite the ABS 17-17. When c>0, the write pole 21 and a section of the flare portion 22 adjacent to the write pole are made of a laminated structure comprised of alternating ferromagnetic layers 24 and AFM-FM phase change material layers 25 as described in the first two embodiments. The ferromagnetic layer 30 has a thickness t in the x-axis direction along a plane that is parallel to the ABS 17-17, and the laminated structure in the write pole and adjacent section of the flare portion 22 has a thickness v along a plane parallel to the ABS that is preferably less than t. In this embodiment, the yoke 23 is directly above the laminated structure, and one side of the ferromagnetic layer 30 may be coplanar with a side of the laminated structure from a cross-track view. The laminated structure has a first end along the ABS 17-17 and a second end opposite and parallel to the first end along the plane 29-29. Ferromagnetic layer 30 has an end that adjoins the second end of the laminated structure, and a second end that corresponds to the back end 23b of the yoke 23. Heating and cooling is achieved by writer coils and/or by a resistive heater or a localized heater source near the write pole tip.

Alternatively, when c=0, the laminated structure comprises only the write pole 21. The yoke 23 and flare portion 22 are made of a single ferromagnetic layer 30 formed above the laminated structure from a cross-track view. Note that the ferromagnetic layer 30 stops along the plane 29-29 which corresponds to the interface between the write pole 21 and flare portion 22 at the front end of flare portion 22.

Figure 9A:
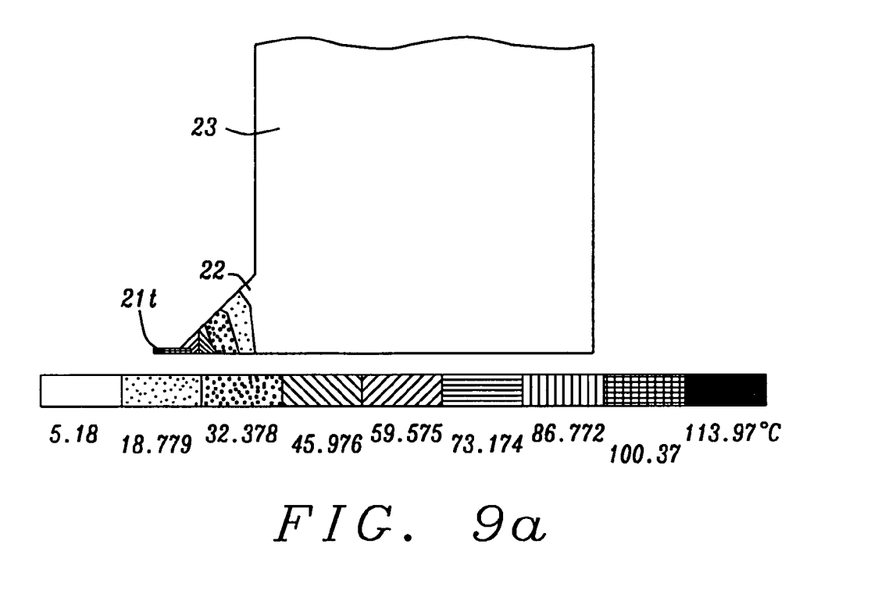
FIGS. 9a, 9b show simulated thermal profiles in a PMR write head where heating is provided by a local heater coil and a Dynamic Fly Heater (DFH), respectively.
Figure 9B:
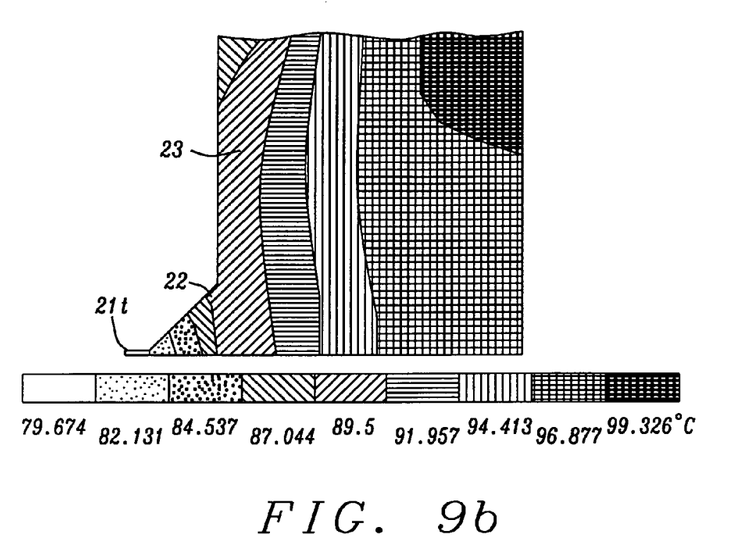

In the configuration shown in FIG. 8, a localized heating source is preferred for several reasons. First, a small local heating coil in the write gap (not shown) near the write pole that is dedicated as a heat source to drive the transitions between AFM and FM magnetic states in AFM-FM phase change material spacers 25 can provide a better and more efficient temperature control than a conventional DFH resistive heater that is typically used to control both the reader actuation at read mode and writer actuation at write mode. The DFH is a resistor typically located near the back end of the yoke in a conventional PMR writer and the heating process causes the main pole layer to expand and push the write pole closer to the recording media. From FEM simulation results, a small heating coil in the write gap region can deliver the thermal requirement for an AFM=>FM transition with only 5.5 mW of power to give a 113.97° C. temperature at the write pole tip 21t with a thermal gradient profile as depicted in FIG. 9a. In contrast, a conventional DFH uses 100 mW plus 40 mA write current to reach 80° C. at the write pole tip 21t with a thermal gradient profile as shown in FIG. 9b. Since the DFH is a greater distance from the write pole than the small heating coil described herein, the DFH creates a lower temperature rise in the write pole 21 where the main writing function occurs while a higher temperature rise is produced in the yoke 23 where heating is less effective for driving AFM=>FM transitions.

A second advantage of a smaller localized heat source is that using a larger conventional DFH type heat source to heat the pole tip to an appropriate temperature for an AMF=>FM transition might result in an unacceptably large protrusion that could be greater than the flying height to cause touchdown to the recording medium. This issue essentially negates the feasibility of utilizing a conventional DFH near the write pole 21 for controlling an AFM=>FM phase change.

A third advantage of a localized heat source is lower power consumption than required for a DFH type heat source to produce the temperature increase necessary for an AFM=>FM transition.

Finally, a small heater design intrinsically has a shorter thermal rise time and shorter settling (cooling) time which has been measured at about 250 µ-sec. This fast response is due to the proximity of the heat source to the write pole tip and a lower volume of magnetic material to be heated. Therefore, the small heater design should be especially advantageous for a high data rate application with its fast response time.

Figure 10:
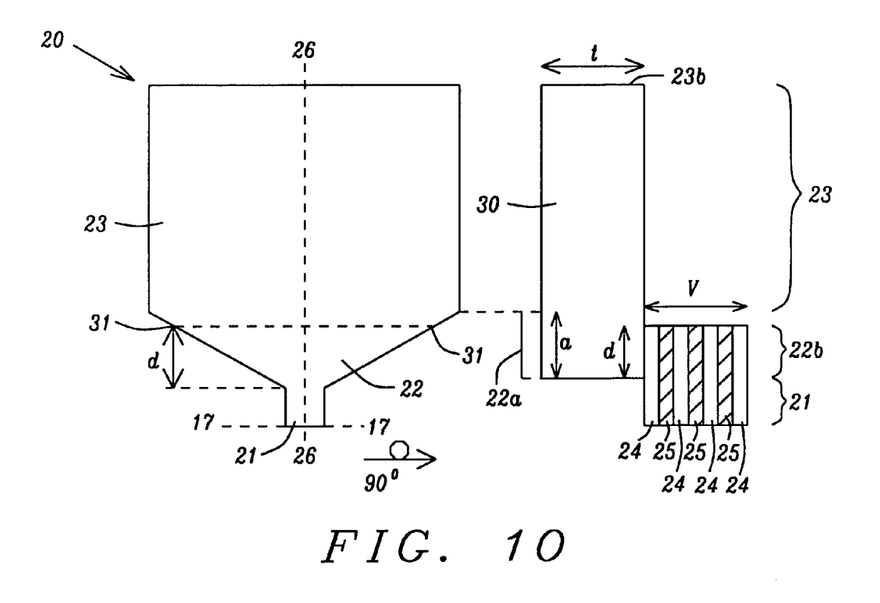
FIG. 10 is a down-track view (left) and cross-track view (right) of a PMR write head having a laminated stitched pole structure according to a fourth embodiment of the present invention.

Referring to FIG. 10, a fourth embodiment is depicted that is similar to the third embodiment in that the PMR writer 20 has a partially laminated configuration. However, in this case, the ferromagnetic layer 30 that includes the yoke 23 and a section of the flare portion 22 is not directly above the laminated structure comprised of alternating ferromagnetic layers 24 and AFM-FM phase change material spacers 25 but is offset to form a stitched pole configuration. The flare portion 22 has a first section 22a attached to an end of the yoke 23 and a second section 22b attached to an end of the write pole 21 opposite the ABS. The first section 22a preferably has the same thickness t as the yoke and extends a distance a from the yoke towards the write pole 21. The second section 22b overlaps the first section 22a for a distance d along a side that is perpendicular to the x-axis and ABS 17-17 and is parallel to the planes of the layers 24, 25 in the laminated structure. The second section 22b has the same thickness v as the write pole 21 in the x-axis direction parallel to the ABS 17-17 from a cross-track perspective. Although the exemplary embodiment shows a>d, the present invention also anticipates a laminated structure wherein d=a and the second section 22b has the same length as first section 22a in a direction perpendicular to the x-axis. Preferably, the second section 22b connects with the first section 22a through a ferromagnetic layer 24. In other words, the laminated structure has a first end along the ABS 17-17 and a second end along the plane 31-31 parallel to the ABS. The surface of ferromagnetic layer 24 adjacent to the first section 22a represents the top surface of the laminated structure and the surface of first section 22a in contact with ferromagnetic layer 24 is considered a first side of the ferromagnetic layer 30 which connects a front end 22f of the flare portion 22 with the back end 23b of the yoke 23.

Figure 11:
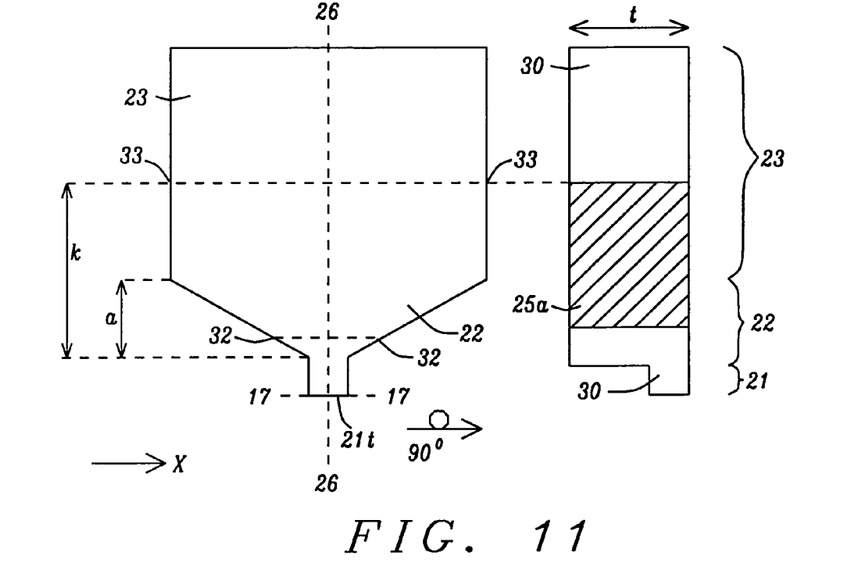
FIG. 11 shows a down-track view (left) and cross-track view (right) of a main pole layer in a PMR writer having an AFM-FM phase change material layer to minimize remanent flux from the yoke from reaching the write pole tip according to a fifth embodiment of the present invention.

Referring to FIG. 11, the present invention also encompasses a fifth embodiment in which an AFM-FM phase change material layer 25a is employed as a flux gate to prevent flux leakage from the yoke 23 to the write pole 21. In an AFM phase during a non-writing condition, the flux gate has close to air magnetic permeability such that the write pole 21 and yoke 23 are essentially magnetically separated. Therefore, the remanent magnetic flux from the magnetic domains or grains in the yoke 23 are prevented from influencing the write pole tip 21t and the PE field can be substantially reduced in a non-writing condition. Besides reducing magnetic remanence from the yoke 23, the flux gate while in an AFM phase also decreases the external field being conducted by the yoke and concentrated by the write pole 21 to minimize unwanted erasure. During a write operation, the flux gate is switched to a FM state and acts like a magnetic material with high permeability.

In one aspect, the AFM-FM phase change material layer 25a has a length k perpendicular to the ABS 17-17 where k>a and comprises a section of the yoke 23 and the flare portion 22 between a plane 33-33 and plane 32-32 that are both parallel to the ABS. The remainder of the PMR writer 20 including write pole 21, and a section of yoke 23 and flare portion 22 is comprised of a single ferromagnetic layer 30. The AFM-FM phase change material layer 25a has the same thickness t as the ferromagnetic layer 30 in the x-axis direction. Note that a section of flare portion 22 adjacent to the write pole 21 is the ferromagnetic layer 30. Control of the AFM=>FM transition in AFM-FM phase change material layer 25a is provided by thermal heating and cooling from the writer coils at writing and non-writing conditions, respectively, or with a separate electrical path such as a coil that generates joule heating locally near the AFM-FM phase change material layer. The ferromagnetic layer 30 is preferably formed by an electroplating operation and the AFM-FM phase change material layer 25a may be formed by a sputter deposition process. The fabrication process may involve a first photoresist mask (not shown) to assist in formation of the ferromagnetic layer 30 and a second photoresist mask to enable deposition of the AFM-FM phase change material layer 25a.

Alternatively, k may be equal to a, and the fifth embodiment encompasses a PMR writer configuration wherein the size of the AFM-FM phase change material layer 25a is reduced compared to that when k>a. In this case, the yoke 23 and write pole 21 are entirely comprised of ferromagnetic layer 30 while a section of the flare portion between the plane 34-34 and 32-32 is comprised of the AFM-FM phase change material layer 25a having a thickness t in the x-axis direction. A section of the flare portion 22 adjacent to the write pole 21 is also comprised of the ferromagnetic layer 30.

Figure 12:
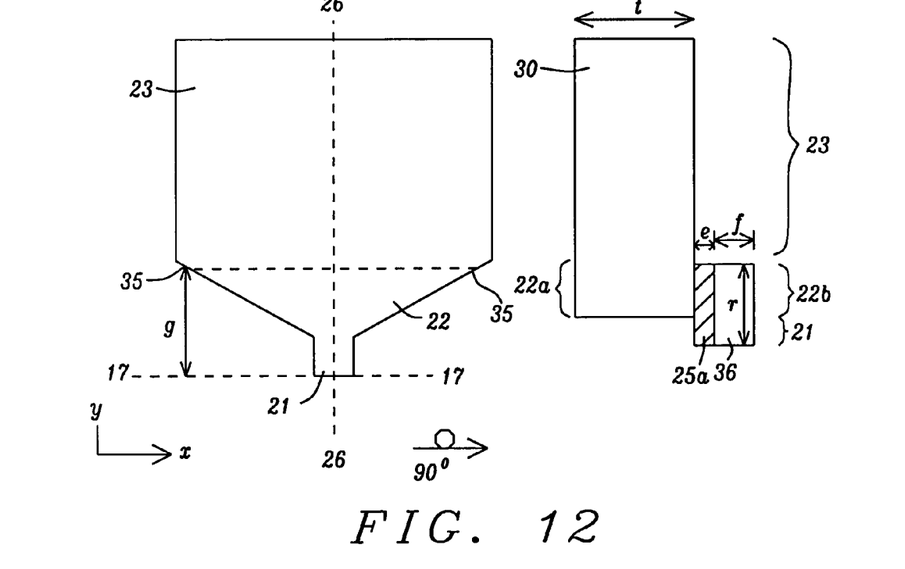
FIG. 12 is a down-track view (left) and a cross-track view (right) of a main pole layer in a PMR writer in which an AFM-FM phase change material layer (flux gate) is formed between first and second sections of a flare portion of the yoke according to a sixth embodiment of the present invention.

Referring to FIG. 12, a sixth embodiment is illustrated which is similar to the stitched pole configuration in the fourth embodiment except the laminated structure of alternating ferromagnetic layers 24 and AFM-FM phase change material spacers 25 in the second section 22b and write pole 21 is replaced by a composite structure comprised of a single AFM-FM phase change material layer 25a with thickness e in the x-axis direction and a ferromagnetic layer 36 having thickness f wherein f is preferably larger than e. Ferromagnetic layer 36 may be made of the same material as in ferromagnetic layer 30. The AFM-FM phase change material layer 25a is formed in a portion of second section 22b and write pole 21 that faces the ferromagnetic layer 30 and acts as a flux gate to prevent flux from yoke 23 and the first section 22b of the flare portion from reaching write pole 21 during a non-write operation. Thus, the AFM-FM phase change material layer 25a is in an AFM state during non-writing conditions and is in a FM state during a write process. Control of the AFM-FM transitions is enabled by thermal heating/cooling from writer coils or from a localized heat source as described previously.

Figure 13:
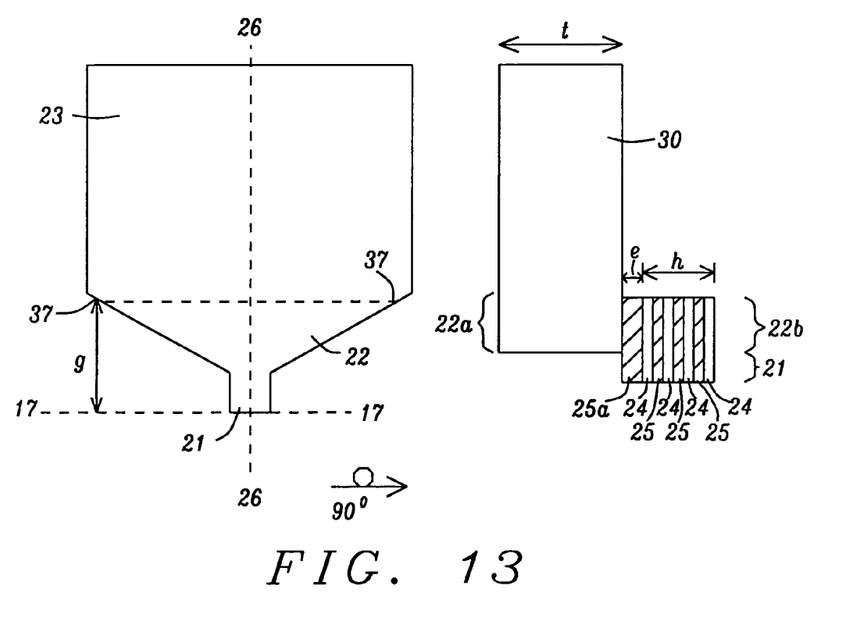
FIG. 13 is a down track view (left) and a cross-track view (right) of the PMR write head in FIG. 11 where a single ferromagnetic layer in the write pole is replaced by a laminated structure having "n" ferromagnetic layers and "n–1" AFM-FM phase change material layers formed in an alternating fashion according to a seventh embodiment.

Referring to FIG. 13, a seventh embodiment is depicted that is similar to the sixth embodiment except the ferromagnetic layer 36 in the second section 22b and write pole 21 is replaced by a laminated structure comprised of a plurality of "n" ferromagnetic layers 24 and "n-1" AFM-FM phase change material spacers 25 formed in an alternating fashion as described in previous embodiments. Furthermore, the AFM-FM phase change material layer 25a adjacent to the first section 22a may be thicker than the AFM-FM phase change material spacers 25 and serves as a flux gate to prevent flux from the yoke 23 and first section 22a of the flare portion 22 from reaching write pole 21 and thereby minimizes pole erasure during non-writing conditions. The top of the AFM-FM material phase change layer 25a and laminated structure is formed along a plane 37-37 at a distance g from the ABS 17-17. Control of the AFM-FM transitions in AFM-FM phase change material layer 25a and in AFM-FM phase change material spacers 25 is enabled by thermal heating/cooling from writer coils and/or from a resistive heater or from a localized heat source as described previously.

It should be understood that after the main pole layer is formed, one or more annealing processes such as hard axis annealing, easy axis annealing, or combinations of both hard axis and easy axis annealing may be employed. Moreover, a planarization process such as a chemical mechanical polish (CMP) step may be performed to smooth one or more surfaces of the main pole layer during the fabrication process.

We have disclosed several embodiments of a PMR writer that take advantage of an AFM-FM phase change material layer and/or spacer in a laminated scheme to control magnetic remanence through AFM coupling during a non-writing condition, and which optimize the write field during a write operation through a FM contribution to improve writability compared with conventional laminated PMR write heads. Fabrication of the various embodiments is achieved by well known photolithography, etching, and sputter deposition techniques. For example, a stitched write head may be fabricated by first forming a yoke and a first section of the flare portion and then in a subsequent sequence of steps, a second section of the flare portion and write pole are formed such that the second section is adjacent to the first section. This unique combination of magnetic remanence suppression during non-writing and maximization of write field during writing has not been achieved in the prior art to our knowledge.

While this invention has been particularly shown and described with reference to, the preferred embodiment thereof, it will be understood by those skilled in the art that various changes in form and details may be made without departing from the spirit and scope of this invention.

We claim:

1. A method of fabricating a perpendicular magnetic recording (PMR) head comprised of forming a main pole layer on a substrate wherein said main pole layer includes a yoke, flare portion, and write pole portion with a write pole tip at an air bearing surface (ABS), said main pole layer is comprised of a laminated structure having a plurality of "n" ferromagnetic layers and "n-1" AFM-FM phase change material spacers wherein the AFM-FM phase change spacers are interchanged between antiferromagnetic (AFM) and ferromagnetic (FM) phases by application of thermal heating and cooling, and said AFM-FM phase change spacers are in an AFM phase when the PMR head is in a non-writing mode and is in a FM phase during a data writing operation.

2. The method of claim 1 wherein the AFM-FM phase change spacers are comprised of a FeRh alloy having a Rh content greater than 35 atomic %, or is made of a FeRhX alloy having a Rh content greater than 35 atomic %, and wherein X is Pd, Pt, or Ir.

3. The method of claim 1 wherein said main pole layer is entirely comprised of a laminated structure in which the plurality of "n" ferromagnetic layers and "n-1" AFM-FM phase change material spacers are arranged in an alternating manner and said ferromagnetic layers and AFM-FM phase change material spacers have planes that are oriented in a lengthwise direction perpendicular to the ABS.

4. The method of claim 3 wherein the laminated structure has a top surface and a bottom surface that are essentially parallel to each other and correspond to a first side and a second side when viewed from a cross-track position, and the main pole layer is further comprised of a ferromagnetic layer formed on one or both sides of the laminated structure and which covers the yoke and at least a section of the flare portion.

5. The method of claim 1 wherein the yoke and at least a section of the flare portion adjacent to the yoke are comprised of a ferromagnetic layer having a first thickness along a plane parallel to the ABS, and said write pole portion is comprised of a laminated structure having a second thickness along a plane parallel to the ABS in which said plurality of "n" ferromagnetic layers and "n-1" AFM-FM phase change material spacers are arranged in an alternating manner and said ferromagnetic layers and AFM-FM phase change material spacers have planes that are oriented in a lengthwise direction perpendicular to the ABS.

6. The method of claim 5 wherein the entire flare portion is comprised of the ferromagnetic layer having a first thickness along a plane parallel to the ABS.

7. The method of claim 5 wherein the yoke and a first section of the flare portion are comprised of the ferromagnetic layer having the first thickness along a plane parallel to the ABS, and the write pole and a second section of the flare portion adjacent to the write pole are comprised of the laminated structure having a second thickness along a plane parallel to the ABS.

8. The method of claim 7 wherein the laminated structure has a first end along the ABS and a second end opposite and parallel to the first end and wherein the ferromagnetic layer has a first end that adjoins the second end of the laminated structure and a second end opposite the first end that corresponds to a back end of the yoke.

9. The method of claim 7 wherein the laminated structure has a first end along the ABS and a second end opposite and parallel to the first end, and has a top surface and a bottom surface that are perpendicular to the ABS and correspond to first and second sides, respectively, when viewed from a cross-track position, said ferromagnetic layer has a first side connecting a front end of the first section with a back end of the yoke and said ferromagnetic layer adjoins the first end of the laminated structure along a surface shared by said first section and said second section of the flare portion to form a stitched PMR head.

10. The method of claim 9 wherein the first section and second section of the flare portion are connected through a ferromagnetic layer at the top surface of the laminated structure.

11. The method of claim 1 wherein at least a section of the flare portion is comprised of an AFM-FM phase change material layer that serves as a flux gate, and the write pole and at least a section of the yoke are comprised of a single ferromagnetic layer.

12. The method of claim 11 wherein the write pole portion and yoke are comprised of said single ferromagnetic layer and the flare portion is entirely comprised of said AFM-FM phase change material layer.

13. The method of claim 1 wherein the yoke and a section of the flare portion adjacent to the yoke are comprised of a first ferromagnetic layer having a lengthwise direction perpendicular to the ABS, and said write pole and a section of the flare portion adjacent to the write pole form a composite structure made of said AFM-FM phase change material layer and a second ferromagnetic layer each having a plane formed perpendicular to the ABS, said composite structure has a first end along the ABS and a second end opposite and parallel to the first end, and has a top surface or side that connects the first and second ends, said top surface is comprised of the AFM-FM phase change material layer that adjoins a side of the first ferromagnetic layer to form a stitched PMR head.

14. The method of claim 1 wherein a transition from said AFM phase to said FM phase is achieved by means of thermal heating, and another transition from said FM phase to said AFM phase occurs by cooling, said thermal heating is provided by writer coils and/or a separate electrical pathway that is localized near the AFM-FM phase change material.

15. The method of claim 1 wherein said main pole layer is formed by a deposition process that comprises sputter depositing one or more layers on said substrate.

16. The method of claim 1 wherein the PMR head is comprised of an AFM-FM phase change material layer and a ferromagnetic layer, said ferromagnetic layer is formed by an electroplating process and said AFM-FM phase change material layer is formed by a sputter deposition process.

* * * * *